United States Patent [19]
Drexhage

[11] 3,873,940
[45] Mar. 25, 1975

[54] LASER MEDIA CONTAINING RIGIDIZED DYES

[75] Inventor: Karl H. Drexhage, Rochester, N.Y.

[73] Assignee: Eastman Kodak Company, Rochester, N.Y.

[22] Filed: Aug. 9, 1971

[21] Appl. No.: 170,348

[52] U.S. Cl. . 331/94.5 L, 252/301.2 R, 260/240 R, 260/240 TC, 260/283 BL, 260/286 R, 260/287 R, 260/289 R, 260/336, 260/343.2 R

[51] Int. Cl. ................................................ H01s 3/00

[58] Field of Search .......... 252/301.2 R; 331/94.5 S, 331/94.5, 94.5 L

[56] References Cited
UNITED STATES PATENTS
3,521,187  7/1970  Snavely et al. ................ 252/301.2 R
3,541,470  11/1970  Lankard et al. ................ 252/301.2 R

OTHER PUBLICATIONS

Schafer et al., Physics Letters, Vol. 24A, 1967, pp. 280–281.

Miyazoe et al., Applied Physics Letters, Vol. 12, 1968, pp. 206–208.

Valenta et al., J. Am. Chem. Soc., 86 (1964), pp. 2533–2534.

*Primary Examiner*—Arthur P. Demers
*Attorney, Agent, or Firm*—D. M. DeLeo

[57] ABSTRACT

Dyes containing at least one rigidized chromophoric nitrogen atom which is part of one or two fused 5-, 6- or 7- membered heterocyclic ring structures are useful as laser dyes. These dyes are used in solution with a non-interfering solvent to form lasing media useful in dye lasers. Such lasers generally include a reservoir for containing the laser dye solution and a pumping energy source operably associated therewith for producing stimulated emission of the dye solution.

6 Claims, No Drawings

LASER MEDIA CONTAINING RIGIDIZED DYES

This invention relates to lasers and more particularly to organic dye lasers and to the use of certain rigidized nitrogen- containing dyes capable of lasing when properly excited.

Lasers (acronym for light amplification by stimulated emission of radiation) or optical masers (acronym for microwave amplification by stimulated emission of radiation) are light amplifying devices which produce high intensity coherent monochromatic light concentrated in a well collimated beam commonly called a laser beam. There are several uses for such laser beams. Since the beam can be sharply focused, it can produce energy densities suitable for drilling, welding, cutting, etc. One potential application of laser beams is in the field of communications where the optical spectrum represents almost limitless bandwidth and information carrying capacity.

It is desirable to have lasers which are operable at many different wavelengths in the light spectrum including infrared, visible and ultraviolet regions. Since the wavelength emitted by a specific energy transition in a laser medium is tunable over only a small portion of the spectrum, it is necessary to provide a number of materials adapted for use as active laser media at various light frequencies. Many of the materials discovered thus far which are capable of acting as laser media have been in the solid and gaseous states. It is also known that certain organic dyes in solution can operate as "liquid" or "organic dye" lasers. Of the range of materials useful as lasing media, organic lasing dyes provide certain advantages. A wide range or organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping". Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al., *IBM Journal*, v. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, localized heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^o$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^o$) to a high energy level from which emissive transition occurs.

In operation, the molecular electrons of the laser medium are desirably pumped to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non- radiatively from $S^1$ to $S^o$, non-radiatively from $S^1$ to a triplet state and then radiatively or non-radiatively from the lowest excited triplet state to $S^o$. Generally, laser emission consists of optical emission resulting from transitions from $S^1$ to various vibrational modes of $S^o$. Susceptibility to triplet formation upon pumping is deleterious due to typical non-radiative energy losses resulting from triplet to $S^o$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designed "population inversion" or "inversion of energy states".

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one end and out of the cavity to constitute the laser output light pulse or the laser beam.

Although many advances have been made in the field of organic dye lasers, a continuing search goes on for materials exhibiting improved lasing efficiency. To date, a variety of lasing dyes have been discovered which contain a pendant amino or substituted amino radical as part of the chromophore. Such dyes are useful; however, it is frequently necessary to include certain addenda to the lasing medium in order to increase the lasing efficiency for both intermittent and continuous wave operation.

Accordingly, it is an object of this invention to provide a novel class of lasing dyes which exhibit increased lasing efficiency.

Another object of this invention is to provide novel liquid lasing media.

A further object of this invention is to provide a means for altering existing laser dyes to improve the lasing efficiency thereof.

These and other objects and advantages are obtained through the use with dye lasers having a reservoir means containing a laser dye solution and a pumping energy source capable of producing stimulated emission of the solution which comprises a lasing concentration in a non-interfering solvent (i.e., one that does not inhibit stimulated emission), of a laser dye having at least one rigidized chromophoric nitrogen atom which is part of one or two fused 5-, 6- or 7-membered heterocyclic ring structures.

The term "rigidized" or "rigidized dye", as used herein, has reference to a dye having a structure which restricts the number of steroisomers in which the dye can exist. Particularly, the conjugated chain which typically defines a chromophore is at least in part integral to a fused ring system that resists the occurrence of numerous rotational modes of vibration in the dye chromophore. As such a fused ring system is free from or has a limited number of chemical bonds that would permit one portion of the chromophore to rotate with respect to another portion of the chromophore, the dye is designated a rigidized dye. In this context, the present invention particularly involves the rigidization of the carbon-nitrogen bond of at least one chromophoric nitrogen atom. As rotation of such a nitrogen atom about the carbon-nitrogen bond is restricted, it is referred to as a rigidized chromophoric nitrogen atom. Similarly, a dye containing such a rigidized bond will be referred to generally as a rigidized dye.

The rigidized dyes of this invention include dyes having an amidinium ion or amidic ion chromophoric system and containing at least one amino substituted phenyl radical through which the conjugated chain of said chromophoric system passes and wherein the nitrogen atom of the amino-substituted phenyl radical is a terminal chromophoric nitrogen atom and is part of one or two 5-, 6- or 7-membered rings fused to said phenyl radical. A wide variety of amino-substituted lasing dyes can be prepared in a rigidized form as described herein. Various useful dyes would include rigidized derivatives of amino-substituted xanthene dyes, such as the rigidized derivatives of Rhodamine B and 6G, etc; aminosubstituted pyrylium and coumarin dyes; aminosubstituted styryl dyes and the like. Of course, other mono-, di- or triamino-substituted lasing dyes which can be rigidized about the carbon-nitrogen bond as described herein can also be used.

Of the rigidized dyes useful in the present invention, advantageous such dyes include those represented by the following structure:

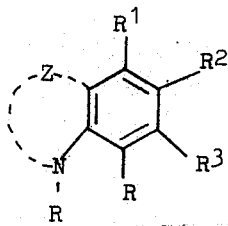

wherein:

Z represents the carbon atoms necessary to complete a fused 5-, 6- or 7-membered heterocyclic nucleus;

each R, when taken separately, represents a hydrogen atom or when taken together, represent the carbon atoms necessary to complete a fused 5-, 6- or 7-membered heterocyclic nucleus;

$R^1$ represents a member selected from a hydrogen atom, a halogen atom (e.g., chlorine, bromine, etc.), a lower alkyl radical, including substituted alkyl radicals, having from 1 to about 7 carbon atoms and alkoxy radicals, including substituted alkoxy radicals, having from 1 to about 7 carbon atoms in the alkyl moiety;

$R^2$ along or together with $R^3$ represents the atoms necessary to complete a dye moiety having an amidinium ion or an amidic ion chromophoric system of which the rigidized N atom above is a part;

$R^3$ represents a hydrogen atom or together with $R^2$, the atoms necessary to complete a dye moiety having an amidinium ion or an amidic ion chromophoric system of which the rigidized N atom above is a part.

Additional advantageous dyes include those having the formula:

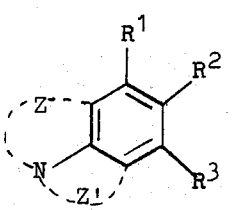

wherein:

Z represents the atoms necessary to complete a fused 5-, 6- or 7-membered heterocyclic nucleus;

Z' represents a hydrogen atom attached to the N atom or the atoms necessary to complete a fushed 5-, 6- or 7-membered heterocyclic nucleus; and R¹, R² and R³ are as described above.

Further advantageous rigidized dyes include those having the formulas:

I.

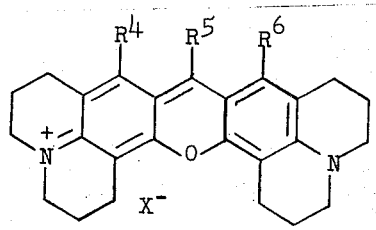

II.

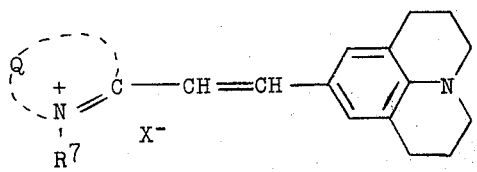

and

III.

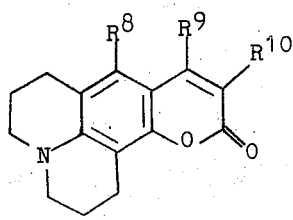

wherein:

R⁴ and R⁶ are each selected from a hydrogen atom and an alkyl radical having from 1 to about 7 carbon atoms;

R⁵ represents a member selected from a hydrogen atom, an alkyl radical having from 1 to about 20 carbon atoms and an aryl radical;

R⁷ represents a member selected from a hydrogen atom, an alkyl radical having from 1 to about 20 carbon atoms and an aryl radical;

R⁸ represents a hydrogen atom, or an alkyl radical having from 1 to about 4 carbon atoms;

R⁹ represents a hydrogen atom, an alkyl radical having from 1 to about 4 carbon atoms, or together with R¹⁰, the carbon atoms necessary to complete a 5- or 6-membered fused ring;

R¹⁰ represents a hydrogen atom, an alkyl radical having from 1 to about 4 carbon atoms, or together with R⁹, the carbon atoms necessary to complete a 5- or 6-membered fused ring;

Q represents the non-metallic atoms necessary to complete a 5- or 6-membered heterocyclic nucleus with the additional atoms of said heterocyclic nucleus being selected from the group consisting of carbon, nitrogen, oxygen and sulfur, including such representative nuclei as imidazole, oxazole, thiazole, quinoline, etc nuclei;

and X⁻ represents an acid anion such as chloride, bromide, iodide, perchlorate, sulfate and the like.

As seen above, R² alone or together with R³ can represent the atoms necessary to complete a dye moiety having an amidinium ion or an amidic ion chromophoric system as described further by Mees and James, *The Theory of the Photographic Process*, 3rd Edition, 201 (1966). Dyes having such chromophoric systems include rhodamines and nitrogen-substituted dyes such as coumarin, pyrylium and styryl dyes. The rigidized forms of these dyes can be prepared by various techniques. For example, the rhodamines can be prepared essentially by the zinc chloride procedure described by H. E. Fierz-David, *Kunstliche Organische Farbstoffe*, p. 275-6, Berline (1926). The pyrylium and coumarin dyes having one such rigidized nitrogen can be prepared by condensing 8- hydroxyjulolidine, as the aminophenol, with a β -keto ester. The keto form or coumarin can readily be isolated from an alcohol such as ethanol and the enol form or pyrylium can be isolated by adjusting the pH to be more acidic. The pyrylium dyes having two such rigidized nitrogens can be prepared by reacting an anhydride, preferably a maleic anhydride, with an aminophenol in the presence of zinc chloride as described by Fierz-David (supra) using as the aminophenol an 8-hydroxyjulolidine as described in JACS, 86, 2533 (1964). The latter bis-rigidized pyrylium compounds also can be prepared by reacting the 8-hydroxyjulolidine with an aldehyde and dehydrating with a strong acid, e.g., sulfuric acid. The styryl dyes useful in this invention can be prepared from active methyl containing heterocyclic compounds having a nitrogen hetero atom by reaction with 8-formyljulolidine in the presence of acetic anhydride.

Exemplary heterocyclic nuclei completed by the nonmetallic atoms represented by Q include those of the type used in cyanine dyes, for example, those nuclei of the imidazole series such as benzimidazole compounds like 5-chlorobenzimidazole and also including compounds of the naphthimidazole series; those of the thiazole series like thiazole, 4-methylthiazole, 4-phenylthiazole, 5-methylthiazole, 5-phenylthiazole, 4,5-dimethylthiazole, 4,5-diphenylthiazole, 4-(2-thienyl) thiazole, etc; those of the benzothiazole series such as benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc; those of the naphthothiazole series like alphanaphthothiazole, 8-methoxy-alpha-naphthothiazole, 7-methoxy-alpha-naphthothiazole, etc; those of the thionaphtheno-7',6',4,5-thiazole series such as 4-methoxythionaphtheno-7',6',4,5-thiazole, etc; those of the oxazole series, for example 4-methyloxazole, 5 -methyloxazole, 4-phenyloxazole, 4,5-diphenyloxazole, 4-ethyloxazole, 4,5-dimethyloxazole, 5-phenyloxazole, etc; those of the benzoxazole series like benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc; those of the naphthoxazole series as alpha-naphthoxazole, etc; and those of the 2-quinoline series such as quinoline, 4-methylquinoline, etc.

As used herein, the term lasing concentration refers to a concentration sufficient to promote, under appropriate conditions such as those mentioned herein, stimulated emission of the laser dye solution. Generally, concentrations of from about $10^{-1}$ to $10^{-5}$ molar are employed, with solutions of from $10^{-2}$ to $10^{-4}$ molar concentrations being preferred for maximum output energies. Still wider variations in concentration can be used for particular operations, if desired.

Although the invention is not to be limited to a particular theory of operation, it is believed that the lower threshold energy required for the present dyes is a result of the inability of the chromophoric nitrogen to rotate about the C—N bond. Such rotation as obtained with an alkylamino-substituted dye (e.g., Rhodamine B) enhances the rate of internal conversion to the ground state, which is a non-radiative process and thus reduces the quantum yield. However, the rigidization of the nitrogen atom as described herein prevents such unwanted rotation.

Useful dyes containing a rigidized chromophoric nitrogen atom as described herein would include such compounds as: 9-(2-carboxyphenyl)-2,3,6,7,12,13,16,17-octahydro-1H,5H,11H,15H- diquinolizino(1,9-bc:1',9'-hi)xanthylium chloride; 2,3,6,7,12, 13,16,17-octahydro-1H,5H,11H,15H-diquinolizino-(1,9-bc:1', 9'- hi)xanthylium chloride; 3-ethyl-4-methyl-2-{β-(9-2,3,6,7-tetrahydro-1H,5H-pyrido[3,2,1-ij]quinolyl)vinyl }-thiazolium iodide; 9-methyl-2,3,6,7-tetrahydro-1H,5H-quinolizino(1,9-gh) coumarin; 2,3,6,7,10,11-hexahydro-1H,5H,9H -quinolizino(1,9-gh)cyclopenta(c)coumarin. Additional representative dyes would include such dyes as 11-(2-carboxyphenyl)dipyrrolino[3,2-b;2,3-i]xanthylium chloride; 8-(2-carboxyphenyl)julolidino[10,9-b]11H-benzo-1- pyran-11-one; 13-(2-carboxyphenyl)-dipyridino[3,2-b;2,3-i]- 1,2,3,4,9,10,11,12-octahydroxanthylium perchlorate; and 8-(2- carbethoxyphenyl)diquinolizino[1,9a,9-ab;1,9a,9-ij]xanthylium chloride. These dyes as well as the dyes of Examples 1, 2 and 5 and the preparation thereof are discussed further in copending George A. Reynolds application Serial No. 170,349, filed Oct. 12, 1971, now abandoned in favor of Ser. No. 244,916 which issued as U.S. Pat. No. 3,822,270 on July 2, 1974, cofiled herewith and entitled PYRYLIUM DYES HAVING A FUSED, RIGIDIZED, NITROGEN-CONTAINING RING.

Representative useful non-interfering solvents which do not inhibit stimulated emission are water; alkanols, including mono-, di- and polyhydric alcohols containing from 1 to about 6 carbon atoms and preferably from 2 to about 4 carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from 1 to about 4 carbon atoms, e.g., phenol, methylphenol, resorcinol, phenylcarbinol, methylphenylcarbinol, etc. Especially useful solvents are fluorinated organic alcohols corresponding to the alcohols described above and discussed further in copending Drexhage application Ser. No. 149,055 filed June 1, 1971, and entitled LASER MEDIA CONTAINING FLUORINATED ALCOHOLS now U.S. Pat. No. 3,736,524. Of course, combinations of liquids can be used as can other solvents known to be useful in the dye laser art.

The present lasing media can be used in a variety of laser apparatus. A laser structure particularly adapted for testing organic dye liquid laser media is that described by Sorokin et al., *IBM Journal* (supra). For continuous operation, the present lasing media can be used in apparatus of the type described in copending application of S. A. Tuccio and O. G. Peterson, Ser. No. 51,790, filed July 2, 1970, and entitled CW ORGANIC DYE LASER. Ser. No. 51,790 was abandoned in favor of Ser. No. 117,595 filed Feb. 22, 1971 (now abandoned) and Ser. No. 484,726, filed July 1, 1974.

The following examples are included for a further understanding of the invention. The threshold energy referred to in the following examples is defined as the light energy from the excitation source which is just sufficient to initiate lasing of the rigidized dye solution. Unless otherwise stated, the excitation source is a giant pulse from a 5300A frequency doubled, neodymium glass laser. The rigidized dye lasing medium is placed in a cuvette which is located between two dielectric mirrors which form a nearly hemispherical dye laser cavity. The light from the excitation or pumping source passes through one of the dielectric mirrors into the dye-containing cuvette and along the optical axis of the cavity. In order to determine the threshold energy, a beam splitter is used to sample the output from the excitation source. The sampled output is measured with a calibrated photodiode. The output of the dye laser is also sampled to determine the wavelength of lasing. The results of one of the following examples cannot be directly correlated with those of any other example mainly because of changes in mirror alignment and other equipment changes. However, the results obtained within any given example can be directly compared.

EXAMPLE 1

Dye (a) 9-(2-carboxyphenyl)-2,3,6,7,12,13,16,17-octahydro-1H,5H,11H,15H-diquinolizino(1,9-bc:1', 9'-hi)xanthylium chloride is mixed in methanol to an optical density of about 2.0 in a 5 cm. dye cuvette. The dye cuvette is placed between two dielectric mirrors described above. The dye is found to lase at about 606 nm., with a threshold energy of 0.29 millijoules. When the comparable dye (b) without the rigidization (Rhodamine B) is tested under the same conditions, it requires 0.45 millijoules to lase at about 584 nm.

(a)

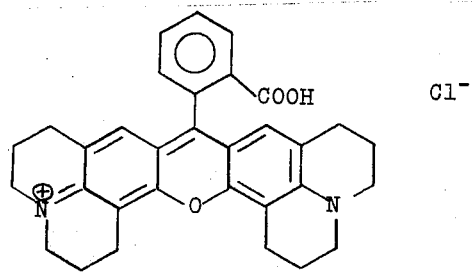

(b)
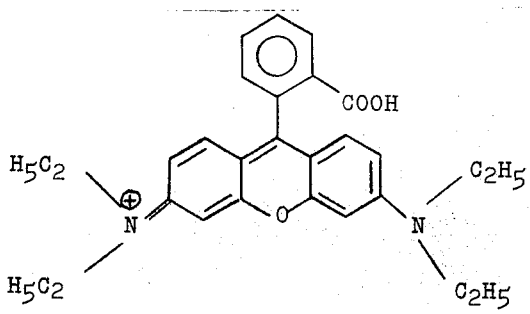

EXAMPLE 2

Example 1 is repeated except that 2,3,6,7,12,13,16,-17-octahydro-1H,5H,11H,15H-diquinolizino(1,9-bc:1',9'-hi)xanthylium chloride is used as dye (a). This dye lases at about 606 nm. with a threshold energy of 0.30 millijoules. When the comparable dye (b) without the rigidization (Pyronin B) is tested under the same conditions the dye requires 0.67 millijoules to lase at about 583 nm.

EXAMPLE 4

Dye (a) 9-methyl-2,3,6,7-tetrahydro-1H,5H-quinolizino-(1,9-gh)coumarin is mixed in methanol to an optical density of about 2.0 at its absorption maximum. The solution is placed in the shell of a heat exchange tank containing cooling coils and is circulated to and from the lasing cavity at a rate sufficient to prevent localized heating. The cuvette is 15 cm. in length and 15 mm. in diameter. About 10 cm. beyond each (a)
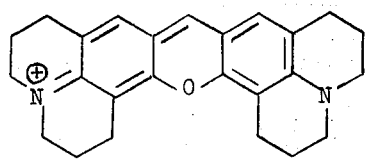

(b)
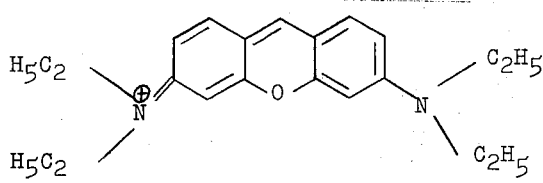

EXAMPLE 3

Example 1 is repeated except that 3-ethyl-4-methyl-2-{β-(9,2,3,6,7-tetrahydro-1H,5H-pyrido[3,2,1-ij]quinolyl)vinyl}thiazolium iodide is used as dye (a) in pyridine solvent. The dye lases at about 627 nm. with a threshold of 3.89 millijoules. The comparable dye (b) 2-p-aminostyryl-3-ethyl-4-methyl thiazolium iodide dooes not lase with any threshold lower than 18.0 millijoules.

end of the cuvette is a plane dielectric flat mirror. In each instance, the lasing medium is excited by a "Sorokin-type" air discharge flashlamp, the spectral output of which is smooth (free of line sources) and similar to a black body source. The energy for the flashlamp is stored by a Cornell Dubillier 1 μf. fast discharge capacitor. Thresholds recorded are the minimum voltages on the capacitor required to initiate lasing. From the threshold voltage, the threshold energy ($E$) is deter- (a)
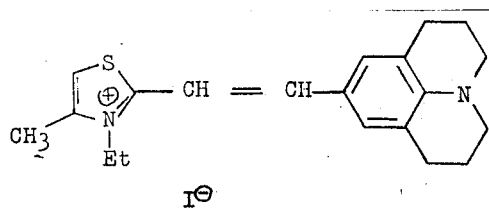

(b)
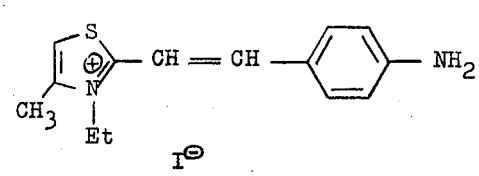

mined from the formula $E=\frac{1}{2}CV^2$ where $C$ is the capacitance of the storage capacitor and $V$ is the voltage across the capacitor. The dye is found to lase at about 481 nm. with a threshold energy of 45 millijoules. When the comparable dye (b) 7-diethylamino-4-methylcoumarin is lased under the same conditions, it lases at about 464 nm. and requires 78 millijoules of input energy.

(a) 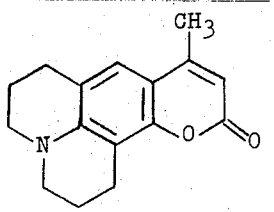

(b) 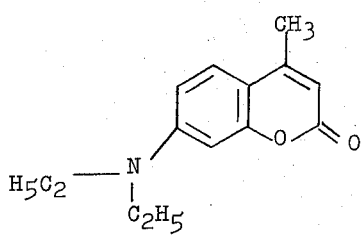

EXAMPLE 5

Example 4 is repeated using 2,3,6,7,10,11-hexahydro- 1H,5H,9H-quinolizino(1,9-gh)cyclopenta(c)coumarin as dye (a) in methanol as the solvent. THe dye lases at about 490 nm. with a threshold energy of 50 millijoules. When the comparable dye (b) 6-diethylamino-2,3-dihydro-1H-cyclopenta(c)coumarin is used under the same conditions, it lases at about 472 nm. and requires 90 millijoules of input energy.

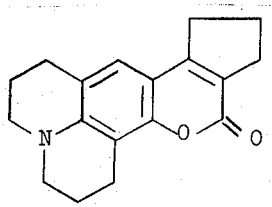

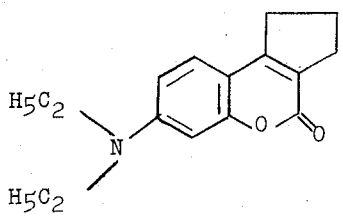

The invention has been described in detail with particular reference to certain preferred embodiments thereof, but it will be understood that variations and modifications can be effected within the spirit and scope of the invention.

I claim:
1. A method of producing coherent laser emission in the operation of a dye laser comprising a pumping energy source operably coupled with a laser dye solution for producing a population inversion therein and means coupled with the population inverted laser dye solution to stimulate therein the emission of a coherent beam of radiation, said method comprising the steps of optically pumping a laser dye solution to produce a population inversion in said solution and stimulating in the population inverted solution emission of a coherent beam of radiation, wherein said solution contains between about $10^{-2}$ and about $10^{-4}$ molar concentration of a lasing dye in a non-interfering solvent, said dye being selected from the group of materials having the formulas as follows:

I. 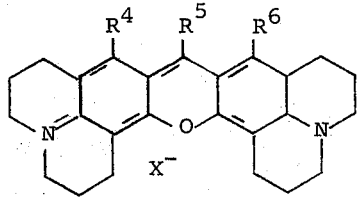

II. 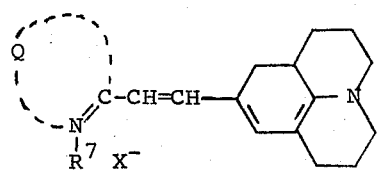

III. 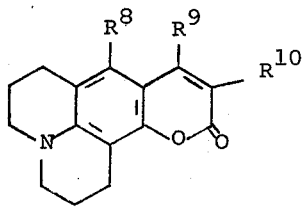

wherein:
$R^4$ and $R^6$ are each selected from the group consisting of a hydrogen atom and an alkyl radical having from 1 to about 7 carbon atoms;
$R^5$ represents a member selected from the group consisting of a hydrogen atoms, an alkyl radical having from 1 to about 20 carbon atoms and an aryl radical;
$R^7$ represents a member selected from the group consisting of a hydrogen atom, an alkyl radical having from 1 to about 20 carbon atoms and an aryl radical;
$R^8$ represents a hydrogen atom, or an alkyl radical having from 1 to about 4 carbon atoms;
$R^9$ represents a hydrogen atom, an alkyl radical having from 1 to about 4 carbon atoms, or together with $R^{10}$, the carbon and hydrogen atom necessary to complete a 5- or 6-membered fused carbocyclic ring;

$R^{10}$ represents a hydrogen atom, an alkyl radical having from 1 to about 4 carbon atoms, or together with $R^9$, the carbon and hydrogen atoms necessary to complete a 5- or 6-membered fused carbocyclic ring;

Q represents the non-metallic atoms necessary to complete a heterocyclic nucleus selected from the group consisting of an imidazole nucleus, an oxazole nucleus, a thiazole nucleus and a quinoline nucleus; and X represents an anion.

2. A method according to claim 1 wherein said dye has the formula:

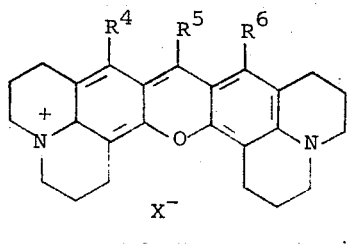

wherein:

$R^4$ and $R^6$ are each selected from the group consisting of a hydrogen atom and an alkyl radical having from 1 to about 7 carbon atoms;

$R^5$ represents a member selected from the group consisting of a hydrogen atom, an alkyl radical having from 1 to about 20 carbon atoms and an aryl radical; and $X^-$ represents an anion.

3. A method according to claim 1 wherein said dye has the formula:

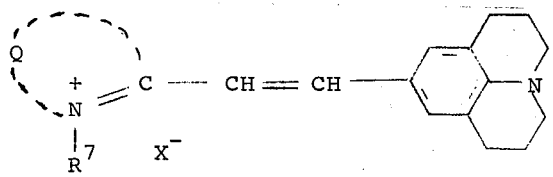

wherein:

$R^7$ represents a member selected from the group consisting of a hydrogen atom, an alkyl radical having from 1 to about 20 carbon atoms and an aryl radical;

Q represents the non-metallic atoms necessary to complete a heterocyclic nucleus selected from the group consisting of an imidazole nucleus, an oxazole nucleus, a thiazole nucleus and a quinoline nucleus; and $X^-$ represents an anion.

4. A method according to claim 1 wherein said dye has the formula:

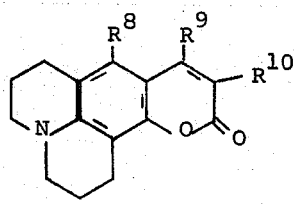

wherein:

$R^8$ represents a hydrogen atom, or an alkyl radical having from 1 to about 4 carbon atoms;

$R^9$ represents a hydrogen atom, alkyl radical having from 1 to about 4 carbon atoms, or together with $R^{10}$, the carbon and hydrogen atoms necessary to complete a 5- or 6-membered fused carbocyclic ring;

$R^{10}$ represents a hydrogen atom, an alkyl radical having from 1 to about 4 carbon atoms, or together with $R^9$, the carbon and hydrogen atoms necessary to complete a 5- or 6-membered fused carbocyclic ring.

5. A method of producing coherent laser emission in the operation of a dye laser comprising a pumping energy source operably coupled with a laser dye solution for producing a population inversion therein and means coupled with the population inverted laser dye solution to stimulate therein the emission of a coherent beam of radiation, said method comprising the steps of optically pumping a laser dye solution to produce a inversion in said solution and stimulating in the population inversion solution emission of a coherent beam of radiation, wherein said solution contains between about $10^{-2}$ and about $10^{-4}$ molar concentration of a lasing dye in a noninterfering solvent, said dye being selected from the group consisting of 9-alkyl-2,3,6,7-tetrahydro-1H,5H-quinolizino[1,9-gh]coumarin, 2,3,6,7,10,11-hexahydro-1H,5H,9H-quinolizino-[1,9-gh]cyclopenta[c]-coumarin and salts of 2-(2-carboxy-phenyl)-2,3,6,7,12,13,16,17-octahydro-1H,5H,11H,15H-diquinolizino-[1,9-bc:1', 9'-hi]xanthylium, 2,3,6,7,12,-13,16,17-octahydro-1H,5H,11H,15H-diquinolizino-[1,9-bc:1:1', 9'-hi]-xanthylium and 3-alkyl-4-alkyl-2-[β-(9-2,3,6,7-tetrahydro1H,5H-pyrido-[3,2,1-ij]quinolyl)vinyl] thiazolium.

6. A method according to claim 5 wherein said dye is 9-methyl-2,3,6,7-tetrahydro-1H,5H-quinolizino(1,9-gh)-coumarin.

* * * * *

UNITED STATES PATENT AND TRADEMARK OFFICE
CERTIFICATE OF CORRECTION

PATENT NO. : 3,873,940
DATED : March 25, 1975
INVENTOR(S) : Karl H. Drexhage

It is certified that error appears in the above-identified patent and that said Letters Patent are hereby corrected as shown below:

Abstract: final line, after "emission of the" insert --- laser ---.

Column 12, line 55 "a hydrogen atoms" should read --- a hydrogen atom ---.

Column 14, line 35 "to produce a inversion" should read --- to produce an inversion ---.

Column 14, line 38 "about $10^{-2}$ and" should read ---about $10^{-2}$ to ---.

Column 14, line 48 "[1,9-bc:1:1',...]" should read ---[1, 9-bc:1',...] ---.

Column 14, line 49 "-tetrahydro1H,5H..." should read --- -tetrahydro-1H,5H... ---.

Signed and Sealed this twenty-eight Day of October 1975

[SEAL]

Attest:

RUTH C. MASON
Attesting Officer

C. MARSHALL DANN
Commissioner of Patents and Trademarks